April 7, 1970  J. S. REID  3,504,797

WASTE DISPOSAL SYSTEM

Filed June 26, 1968

INVENTOR.
JAMES S. REID
BY
*Meyer, Tilberry & Body*
ATTORNEYS

__United States Patent Office__

3,504,797
Patented Apr. 7, 1970

3,504,797
WASTE DISPOSAL SYSTEM
James S. Reid, Hudson, Ohio, assignor to Standard Products Company, Cleveland, Ohio, a corporation of Ohio
Filed June 26, 1968, Ser. No. 740,164
Int. Cl. B01d 1/14
U.S. Cl. 210—152                    8 Claims

ABSTRACT OF THE DISCLOSURE

A waste disposal system for a vehicle in which a dissipatus tube is located in the exhaust manifold with the hot exhaust gases vaporizing and purifying the liquid waste material as it passes through the tube.

---

This invention relates generally to improvements in waste disposal systems and, more particularly, to a disposal system especially designed for the disposal of human waste and all other like disposable waste products.

Although not limited thereto, the waste disposal system of the present invention has particular utility for use in powered boats. The disposal system may also be employed in other vehicular units such as buses, trucks, house trailers, mobile homes, and various other types of vehicles utilized for human transportation. In addition, the waste disposal system may find utility in domestic housing installations or the like where a conventional sewage system such as is presently in use in most large municipalities is not available.

One factor which has limited the range and/or the use of various types of vehicular units for extended transportation has been the limitation on the waste disposal systems employed in such units. Typically, these prior art systems merely accumulate or collect the waste material. Consequently, since these systems have a limited capacity and period of use, the vehicle associated therewith likewise is comparatively limited for its intended purpose.

Still another limiting factor in the use of presently available waste disposal systems in vehicles is that the system must function as a completely self-contained unit to prevent the discharge of any harmful waste material and/or odor into the atmosphere. This is true not only in the case of land vehicles but also with respect to water borne craft, where the discharge of waste material into public bodies of water is prohibited.

There is disclosed in U.S. Patent No. 3,342,337 assigned to the assignee herein, an improved waste disposal system which overcomes many of the shortcomings of the prior art and is particularly applicable for use with land type vehicles. The system disclosed in that patent is operable over extended periods of time without any evidence of accumulation of waste material which would limit its period of use. Further, the waste disposal system disclosed in that patent is a completely self-contained unit whereby its operation prevents contaminants from being discharged into the atmosphere and provides for the disposal of human waste products and/or the like while the vehicle is in transit.

Although the system disclosed in the aforesaid patent operates entirely satisfactorily when utilized on land type vehicles, such a unit is not adapted for use with water borne craft such as power boats. There are several reasons for this, foremost of which is the space limitation inherent in power boats.

It is the primary object of this invention to provide an improved waste disposal system which includes the advantages of the system described in the aforesaid patent, as well as others, but which is applicable for use with power boats or other vehicles in which little or no space is otherwise available for such a system.

In accordance with this primary object, the invention contemplates the use of a dissipatus tube which is placed directly in the exhaust manifold of the engine by which the boat is powered with the tube being adapted to conduct liquid waste through the exhaust manifold where the waste material is vaporized and leaves as a purified gas which is subsequently discharged into the tailpipe, either as a gas or a condensed liquid.

The invention further contemplates that the tube through which the waste material passes will be relatively short. The very high temperatures present in the exhaust manifold, together with a metering pump which controls the flow of waste material, assures complete conversion of the waste material to a gas before it is discharged.

A further object of the invention is to provide an improved waste disposal system which is simple in construction and which employs a minimum of parts.

Additional objects and advantages of the improved waste disposal system of this invention will be apparent upon reference to the following description and attached drawings which illustrate but one preferred embodiment of the invention.

Referring now to the drawings wherein, like reference numerals indicate like parts in the various views.

Figure 1:
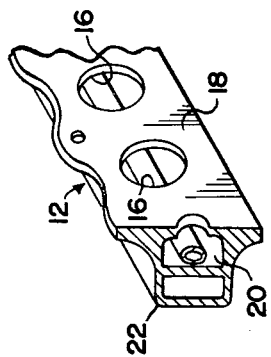
FIGURE 1 is a perspective view of the waste disposal system incorporated in a power boat.
Figure 1:
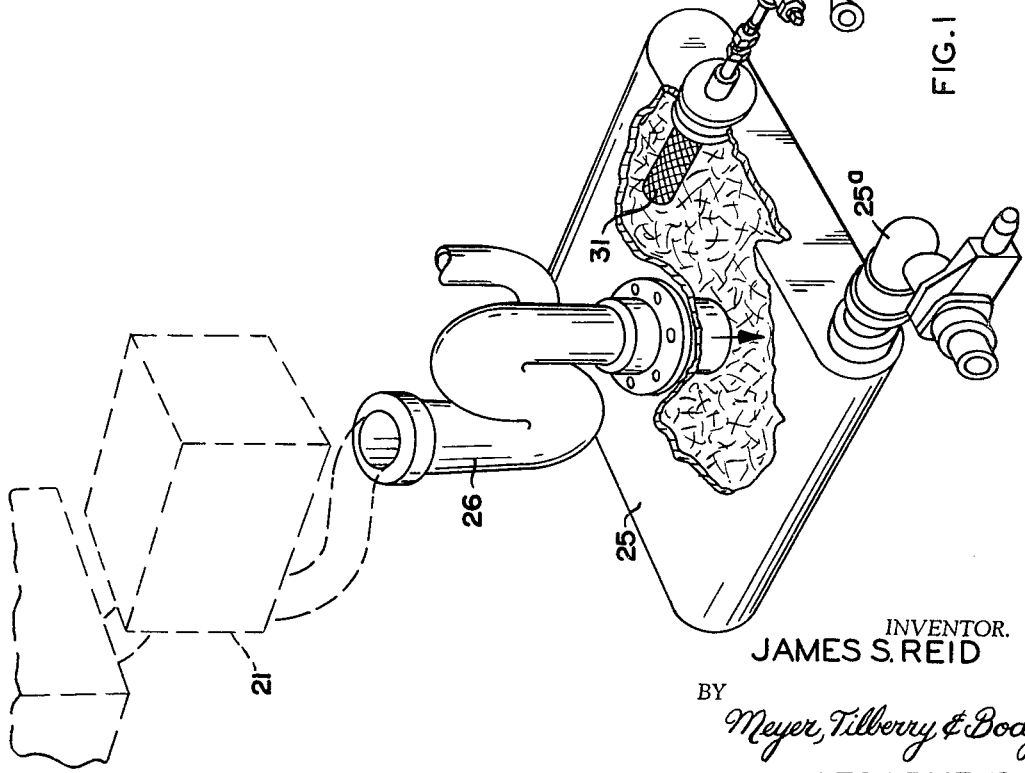

Referring now to FIGURE 1, the waste disposal system of the present invention is illustrated as adapted for use with a power boat and which includes a source of motive power such as an engine schematically illustrated at 10. The engine is a conventional marine engine and includes the conventional exhaust system for discharging the by-products of combustion from the engine. Typically, this exhaust system includes an exhaust manifold 12 secured to the block of the engine and to which one end of an exhaust pipe 14 is connected. As is conventional, the exhaust manifold includes a plurality of exhaust ports 16 formed in one wall 18 of the manifold with the ports opening into the cylinder chambers in the engine block. The exhaust ports provide apertures through which the products of combustion are discharged into an exhaust manifold chamber 20. A water cooling jacket 22 normally surrounds at least a portion of the manifold chamber 20. Cooling water is circulated through the water cooling jacket 22 by an inlet tube 24 and an outlet tube 26 with the latter tube discharging into the exhaust pipe 14.

It will be readily understood that the hot exhaust gases emerging from the engine 10 pass through the exhaust ports 16 into the manifold chamber 20 and then to the exhaust pipe 14 where the gases are discharged. These hot exhaust gases which are normally at a very high temperature when they pass through the exhaust ports 16, are utilized to vaporize the fluids produced in the waste disposal system described hereinafter.

The waste disposal system includes a conventional water closet indicated by the reference numeral 21 which is located in the lavatory of the boat and which is designed to receive human waste products therein. A suitable flush tank filled with a source of water or other fluids is connected to the water closet and provides the medium whereby the solid products are transported from the water closet to a waste tank shown at 25.

The waste tank 25 may be conveniently located so as to be readily available for cleaning, maintenance and the like. A drain 25*a* may be provided on the waste tank, preferably adjacent the bottom thereof, to facilitate cleaning of the tank.

The tank 25 is connected through a waste trap conduit 26 of conventional construction to the water closet 21. The waste tank 25 is a closed receptacle which receives waste products and flushing liquid. The tank is constructed to function as a conventional septic tank whereby, in a manner well known, solid materials are digestively attacked by anaerobic organisms and are thereby turned ultimately, with the fluid, into a partially purified fluid solution.

An outlet conduit assembly, indicated generally by the reference numeral 30, is connected at one end to the waste tank 25 and includes a suitable screen type filter 31 which is located inside the waste tank. The filter 31 defines a liquid level wherein a substantially complete anaerobic process may be performed on the solid waste material and also functions to prevent any solids from escaping from the tank.

The outlet conduit assembly 30 also includes a suitable shutoff valve 32, an in-line liquid pump 33 and a conventional T-fitting 34. The fitting 34 may be utilized to introduce a cleaning fluid to be passed through the tank in the event periodic maintenance and/or cleaning thereof is desired. It is to be understood that the valve 32 and the fitting 34, as well as filter 31, are conventional and form no portion of this invention with each or all of these elements being optional in the construction employed.

Connected to the discharge port of the pump 33 is a dissipatus tube 40. This dissipatus tube 40 is constructed from a suitable corrosion resisting material. The material from which the tube 40 is fabricated must also be resistive to high temperatures. Inconel is one example of a suitable material from which the tube 40 may be fabricated.

Figure 2:
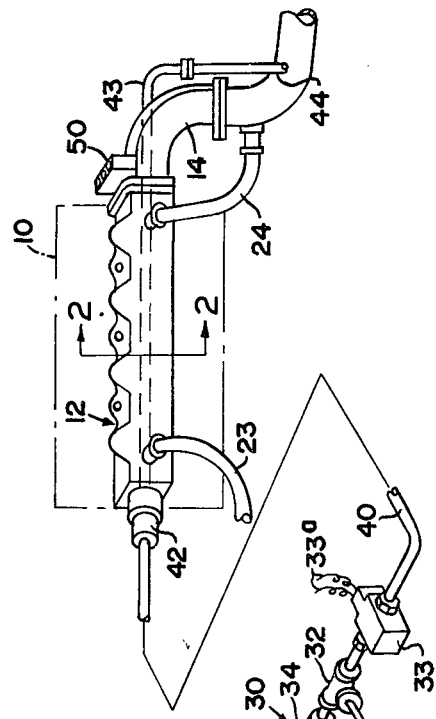
FIGURE 2 is a sectional view through the exhaust manifold of the engine illustrating the dissipatus tube as it is incorporated in the manifold.

The tube is disposed in and extends through the exhaust manifold chamber 20 in the manner best shown in FIGURE 2. Appropriate supports for the tube within the chamber may be employed if required; however, in view of the relatively short length of the manifold chamber 20, it is normally sufficient to support the tube at either end exteriorly of the chamber. Preferably, some form of expansion joint 42 would be employed at the entrance and exit ends of the chamber 20 thereby to compensate for expansion and contraction of the tube as it is exposed to varying temperature conditions.

The tube 40 passes completely through the chamber 20 and extends beyond the exhaust manifold, at which point 43 it is bent downwardly and is connected at 44 to the exhaust pipe 14.

Mounted on the exhaust pipe adjacent to the exhaust manifold is a temperature responsive switch mechanism, indicated generally by the reference numeral 50. This switch comprises a thermal block on which a thermostatic switch is mounted with the switch being connected by appropriate electrical connections 33a to the pump 33. The thermal block may be made from aluminum or any other suitable heat conducting metal which will transmit the heat of the exhaust pipe to the thermostatic switch. The switch is located immediately adjacent to the exhaust manifold so that the temperature sensed by the switch is substantially the temperature which is present in the exhaust manifold chamber 20.

The above described waste disposal system operates in the following manner. Waste material is deposited in the waste tank 25 where it is converted into a partially purified fluid solution. When the level of liquid waste in the tank has risen to the level of the filter 31 and it is desired to dispose of this liquid material, the fluid is pumped by the pump 33 to the dissipatus tube 40. However, before the pump may be actuated, it is necessary that the engine 10 be running a sufficient period of time that the temperature in the exhaust manifold has risen to a pre-determined level, at which point the pump control switch 50 is actuated. Thereafter, liquid is pumped through the dissipatus tube where the liquid is subjected to the high temperatures in the manifold chamber 20. These high temperatures rapidly vaporize the liquid waste so that the material in the tube 40 is substantially in vapor form as it emerges from the exhaust manifold. The vapor becomes cooled and reverts partially or substantially to a liquid form in the portion of tube 40 which is exterior to the exhaust pipe 14. The vapor and/or liquid is then discharged into the tail pipe 14 where it is mixed with the exhaust gases and the water from the cooling jacket and discharged through the exhaust pipe.

Since the fluid in the dissipatus tube is vaporized and subsequently condensed, it is purified so that the resultant gases or liquid discharged into the tail pipe do not create any health hazards.

Several advantages are apparent with this system. The dissipatus tube provides a completely closed circuit through which the liquid waste is passed and vaporized. No portion of the exhaust system is subjected to contact with the liquid waste material thereby avoiding any problems of corrosion or the imposition of stresses by the contact of a cool liquid with the hot metallic surfaces of the exhaust manifold. In addition, the dissipatus tube constitutes an efficient means for vaporizing the liquid. Only a short length of tube is required since the exhaust gases to which the tube is exposed are at a very high temperature. In combination with the short tube and the high temperatures, the switch 50 insures that the liquid waste material is injected into the tube only after satisfactory temperature level is available. Moreover, the pump 33 serves two useful functions. It functions to insure the positive injection of a continuous quantity of liquid to thereby expedite the disposal of the waste material in the tank 25. In addition, it is contemplated that the pump will be carefully selected so that it delivers only a metered amount of liquid waste to the dissipatus tube. This metered amount should be carefully determined so that only an amount of liquid which can be completely vaporized before it is discharged into the exhaust pipe is delivered by the pump.

It is apparent that the described disposal system readily lends itself to applications where space is at a premium. Thus, other than the water closet and waste tank which must always be present with any system, the only additional space required for this system is with respect to the small length of tubing leading into the exhaust manifold and the small portion of tubing which is exposed at the exit end of the exhaust manifold. With but these two exceptions, the waste disposal system requires no space other than that which is already available in any vehicular unit. As a result, the described system is particularly well suited for use in boats or other similar vehicles in which space is otherwise unavailable.

It is believed apparent that the above described waste disposal system achieves each of the objects and advantages set forth above. Modifications and alterations in the described embodiment will suggest themselves to those having ordinary skill in the art and it is intended that such modifications and alterations are to be included within within the scope of the invention as defined by the appended claims.

Having thus described my invention, I claim:

1. An improved waste disposal system comprising, in combination, a power source such as an engine in which waste heated gases are generated, said source having an exhaust system including an exhaust manifold for disposing of said heated gases, said disposal system including a waste tank for receiving liquid waste material and means connected to said tank operative to employ the waste heat in said exhaust system for vaporizing the liquid collected in said tank, the improvement comprising:

said vaporizing means including liquid conducting means disposed in said exhaust manifold with said conducting means being positioned to be completely immersed in heated gases passing through said exhaust manifold when said power source is in operation, one end of said conducting means being connected to said tank with the other end of said conducting means discharging the generated vapors.

2. The improvement of claim 1 and including a metering pump connected to said conducting means for delivering a metered amount of liquid waste material to said conducting means in said exhaust manifold.

3. The improvement of claim 1 wherein said liquid conducting means comprises a tube extending lengthwise through said exhaust manifold.

4. The improvement of claim 1 wherein said exhaust manifold comprises an exhaust manifold chamber with exhaust ports communicating said exhaust chamber with the combustion chamber of said power source, said exhaust manifold further including a cooling jacket surrounding at least a portion of said chamber, said liquid conducting means being located in said exhaust manifold chamber and adjacent to said exhaust ports whereby said conducting means is directly exposed to the hot exhaust gases discharged through said exhaust ports.

5. The improvement of claim 3 and including expansion joint means supporting said tube at least at one end of said exhaust manifold.

6. The improvement of claim 2 and further including temperature responsive switch means for activating said pumps only when the temperature of said manifold has reached a pre-determined level.

7. The improvement of claim 3 wherein said tube extends exteriorly of said exhaust manifold with the exterior end of said tube in communication with said exhaust pipe.

8. The improvement of claim 4 and further including means for discharging the cooling medium in said jacket into said exhaust pipe whereby said vaporized waste is mixed with the cooling medium and the exhaust gases before being discharged from said exhaust pipe.

References Cited

UNITED STATES PATENTS

| | | | |
|---|---|---|---|
| 2,921,681 | 1/1960 | Toulmin | 210—71 |
| 2,938,630 | 5/1960 | Novak | 210—181 X |
| 3,342,337 | 9/1967 | Reid | 210—152 |

JOHN W. ADEE, Primary Examiner

U.S. Cl. X.R.

210—181